United States Patent [19]

Welker

[11] Patent Number: 5,168,140
[45] Date of Patent: Dec. 1, 1992

[54] MICROWAVE COFFEE BREWER AND TRAVEL MUG

[76] Inventor: Helmut Welker, 2463 Horton Rd., Jamestown, N.Y. 14701

[21] Appl. No.: 653,710

[22] Filed: Feb. 11, 1991

[51] Int. Cl.⁵ .................... H05B 6/80; A23F 3/00
[52] U.S. Cl. ................. 219/10.55 E; 426/82; 426/241; 99/323; 99/DIG. 14
[58] Field of Search ............ 219/10.55 E, 10.55 R; 426/82, 234, 241, 243; 99/323, 323.3, 451, DIG. 14

[56] References Cited

U.S. PATENT DOCUMENTS

| | | | |
|---|---|---|---|
| 3,657,994 | 4/1972 | Post | 99/323 |
| 3,669,001 | 6/1972 | Asen | 99/78 |
| 3,679,088 | 7/1972 | Swett et al. | 220/42 R |
| 3,684,123 | 8/1972 | Bridges | 220/9 R |
| 3,743,131 | 7/1973 | Croyle et al. | 220/24.5 |
| 3,773,207 | 11/1973 | Dokoupil et al. | 220/27 |
| 4,026,459 | 5/1977 | Blanchard | 229/43 |
| 4,086,848 | 5/1978 | Hahn | 99/323 |
| 4,104,957 | 8/1978 | Freedman et al. | 99/283 |
| 4,176,588 | 12/1979 | Baron | 99/323 |
| 4,186,842 | 2/1980 | Albert | 220/206 |
| 4,577,080 | 3/1986 | Grossman | 219/10.55 |
| 4,721,835 | 1/1988 | Welker | 219/10.55 |
| 4,900,886 | 2/1990 | Bridges | 219/10.55 |
| 4,908,222 | 3/1990 | Yu | 426/241 |
| 4,948,601 | 8/1990 | Serbu | 426/241 |
| 4,977,820 | 12/1990 | Lin | 99/323 |

Primary Examiner—Philip H. Leung
Attorney, Agent, or Firm—Bean, Kauffman & Spencer

[57] ABSTRACT

A beverage brewer and travel mug provided for brewing small quantities of a beverage within a microwave oven, includes a cup for receiving a charge defined for example by water and ground coffee, and a lid serving to contain the charge during the brewing operation, while allowing for escape of steam, and thereafter to permit transport of the brewed beverage without spilling and permit drinking of the beverage from which grounds are effectively filtered.

22 Claims, 3 Drawing Sheets

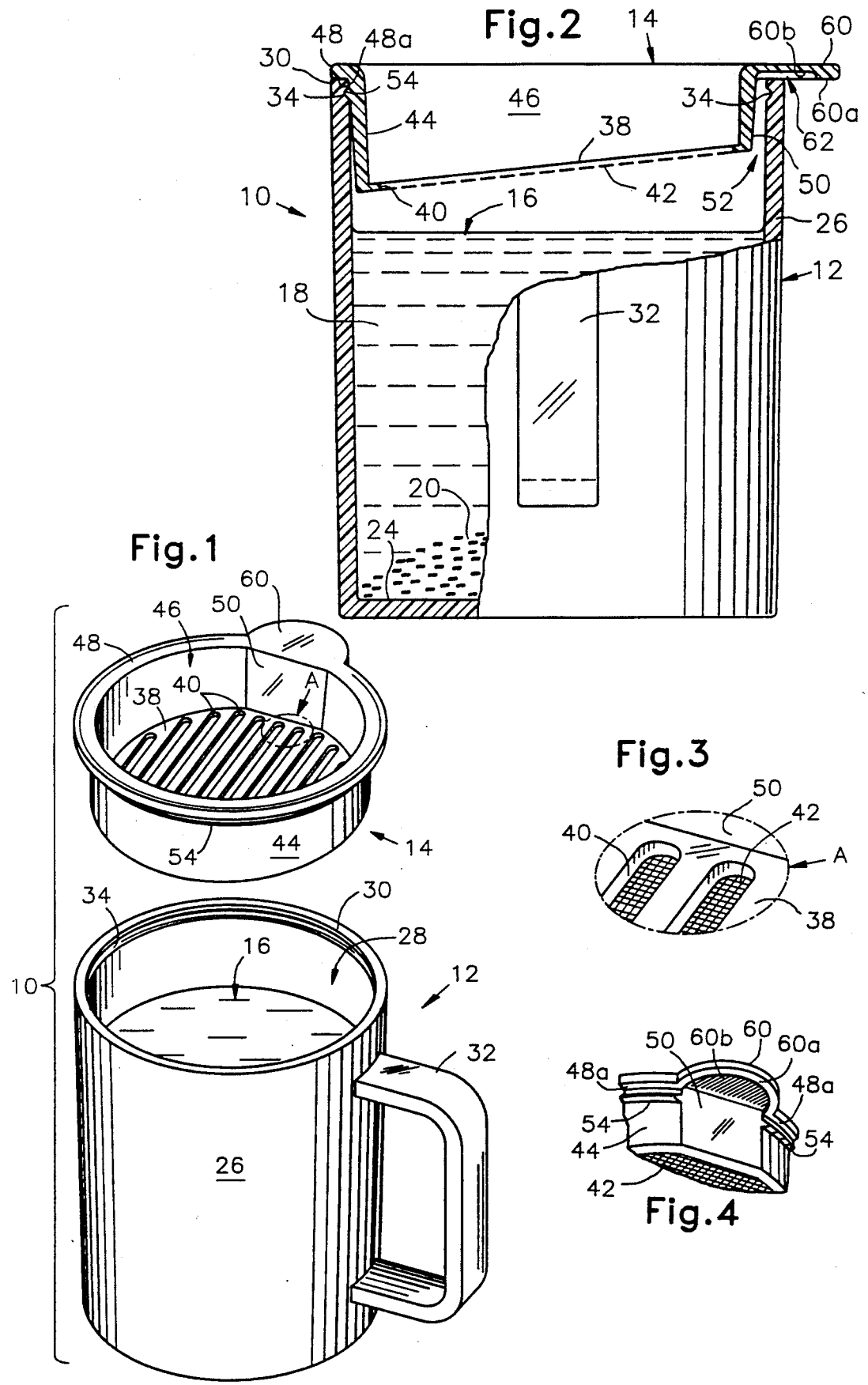

MICROWAVE COFFEE BREWER AND TRAVEL MUG

BACKGROUND OF THE INVENTION

Travel mugs having apertured, recessed, snap-on lids for minimizing spillage of a contained beverage, such as coffee, have come into wide usage. A disadvantage of known prior travel mugs is that they require a beverage they are to transport to be brewed by a separate apparatus and then transferred to the travel mug.

In my prior U.S. Pat. No. 4,721,835, there is disclosed a cup adapted to permit brewing of small quantities of a desired beverage, such as coffee, within a microwave oven. A disadvantage of this prior invention is that it is not suited for use as a drinking or transporting container for the brewed beverage, and thus requires the beverage to be poured into a second cup or travel mug.

SUMMARY OF THE INVENTION

The present invention relates to a beverage brewer and travel mug, which combines the advantages of the microwave beverage brewing cup of my prior U.S. Pat. No. 4,721,835 and a conventional travel mug, while avoiding the disadvantages of each.

More particularly, the present invention relates to a beverage brewer and travel mug for brewing small quantities of a beverage within a microwave oven, which includes a cup for receiving a charge preferably in the form of water and ground coffee and a lid for retaining the charge within the cup, while allowing for escape of steam, during a brewing operation. In a presently preferable form of the invention, the lid of the mug cooperates with the cup to define a passageway permitting escape of steam/inflow of air, and incorporates a filter element(s) for straining coffee grounds from brewed coffee, as an incident to tipping of the mug for purposes of drinking coffee. As in the case of a conventional travel mug, the upper surface of the lid of the present mug is preferably recessed or shaped to define a reservoir for receiving coffee permitted to flow through openings in a bottom wall of the lid when the mug is tipped for drinking purposes.

In alternative embodiments of the invention, the lid is of two-part construction having a coffee receiving reservoir portion and a filter portion. The filter portion may be either removably carried by the reservoir portion or removably positioned between the reservoir portion and the cup.

It will be appreciated that the filtering area required in the present mug may be substantially smaller than that required for the cup of U.S. Pat. No. 4,721,835 in that beverage is not normally dispensed immediately after brewing, thereby minimizing the likelihood that the filtering area will be plugged by solids.

BRIEF DESCRIPTION OF THE DRAWINGS

The nature and mode of operation of the present invention will now be more fully described in the following detailed description taken with the accompanying drawings wherein:

FIG. 1 is an exploded, perspective view of the lid and cup of the invention;

FIG. 2 is an enlarged, fragmentary, vertical cross-sectional view showing the lid and cup in assembled condition;

FIG. 3 is an enlarged view of the circled area designated by the letter A in FIG. 1;

FIG. 4 is a partial bottom perspective view of the lid in the area of the pull tab thereof;

DETAILED DESCRIPTION

Figure 5:
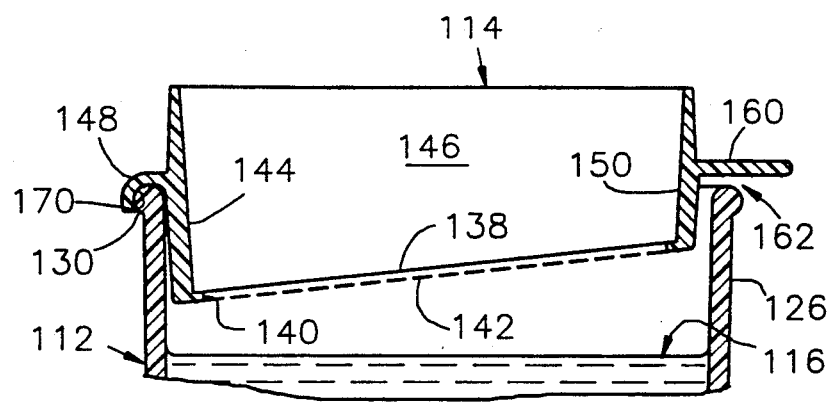
FIG. 5 is a partial, vertical cross-sectional view similar to FIG. 2, but showing an alternative embodiment of the invention.

Referring to FIGS. 1 and 2, a beverage brewer and travel mug formed in accordance with a preferred form of the invention is designated as 10 and shown as generally comprising a cup 12 and a lid 14 for removably covering the cup.

As will become apparent, mug 10 is intended for use in brewing a beverage within a microwave oven, not shown, while retained in cup 12 with the aid of lid 14, and then permitting a user to subsequently drink the brewed beverage from the mug, while retaining solids within the cup. The beverage may for example be coffee provided by brewing a charge 16 placed within the confines of cup 12 and defined by desired volumes/preparations of water 18 and ground coffee 20. In a preferred form of the invention, cup 12 is sized to receive charge 16 sufficient to produce one cup of coffee, but of course the invention is not limited thereto.

Cup 12 is preferably defined by a bottom wall 24, a cylindrical side wall 26 arranged to upstand from the periphery of the bottom wall and define an open mouth 28 bounded by an annular rim 30; and a handle 32 fixed to the side wall. Side wall 26 is provided with a radially inwardly facing or opening annular mounting recess 34 disposed adjacent rim 30.

Lid 14 is preferably defined by a bottom wall 38 provided with one or more suitably sized beverage flow filtering openings defined for example by through openings or apertures 40 bridged by a screen element(s) 42; and a side wall 44 arranged to upstand from the periphery of the bottom wall and cooperate therewith to define an upwardly open recess or reservoir 46 bounded by a rim 48. Side wall 44 generally conforms to the configuration of the inner surface of side wall 26, except where the former is inset to define a panel portion 50, which serves to cooperate with side wall 26 to define a first flow passage 52 when cup 12 and lid 14 are in assembled condition, as shown in FIG. 2. Lid 14 may be releasably connected to or assembled with cup 12 by suitable means, such as by forming side wall 44 with a radially outwardly projecting mounting means, such as a rib 54 arranged to extend annularly thereof between the opposite sides of panel 50 and sized to be resiliently snap fit received within mounting recess 34. As best shown in FIG. 2, side wall 44 is preferably downwardly and inwardly tapered in a direction towards bottom wall 38 to facilitate insertion of the lid within the cup, and bottom wall 38 is preferably downwardly inclined in a direction away from panel portion 50.

Side wall 44 includes a rim 48 arranged to project radially outwardly thereof adjacent its relatively upper end and an enlarged pull tab 60 arranged essentially coplanar with rim 48 and sized to project radially outwardly of cup side wall 26 when cup 12 and lid 14 are in assembled condition. Pull tab 60 has a lower surface shaped to define a generally U-shaped edge surface 60a arranged to lie essentially coplanar with the downwardly facing surface 48a of rim 48 and a centrally located recessed area 60b, which cooperates with cup rim 30 to define a second flow passage 62 arranged for flow communication with the upper end of first flow passage 52 when cup 12 and lid 14 are in assembled condition, thereby to create a vent placing the interior of the cup in flow communication with the atmosphere. Engagement of mounting rib 54 within mounting recess 34 and/or engagement of rim lower surface 48a and the opposite ends of edge surface 60a with cup rim 30 serves to provide a liquid seal peripherally of cup 12 and lid 14, except for the relatively constricted peripheral area defined by flow passages 52 and 62.

Pull tab 60 both facilitates removal of lid 14 from cup 12 and provides a visual indication of the placement of flow passages 52 and 62 and thereby advise a user that a beverage should be drunk from within recess 46 remotely of the pull tab.

Cup 12 and lid 14 may be fabricated from any suitable material(s) adapted for use within a microwave oven and to withstand the temperature to which charge 16 is to be raised during a brewing operation. As by way of example, the components of the invention may be conventionally formed of polyester, polysulfone, polycarbonate or polypropylene. Screen elements 42 may be formed as an integral part of lid 14, but are preferably, separately formed as polyester or nylon screening inserts placed into a mold into which the plastic material used in forming lid 14 is to be injected.

The size and number of openings 40, together with the mesh size of screen element 42 are chosen to permit the liquid component of a brewed beverage to pass therethrough when mug 10 is tipped for purposes of drinking the beverage. On the other hand, the size of screen element 42 is chosen to prevent passage therethrough of the solid component and thus retain such solid component within cup 12 until such time as lid 14 is intentionally removed for mug cleaning purposes.

In use of mug 10, a desired charge 16 is placed within cup 12, lid 14 applied to the cup and the assembled mug placed in a microwave oven at a desired setting and for a time sufficient to brew the charge to an extent determined by user preference. During brewing, steam is permitted to escape through the tortuous path defined by passages 52 and 62 and through screen element 42 in order to prevent the building up of pressure within the cup sufficient to unseat the lid. Sole reliance of the screen element for this purpose is not preferred in that there is a tendency for the screen element to become temporarily obstructed with solids/liquid during brewing, depending on the mesh size of the screen element, with the result that the inflow of air and dispensing of liquid may be prevented. After the brewing operation, the mug is removed from the microwave oven and thereafter serves as a convenient, transportable receptacle from which the brewed beverage may be drunk without loss of solids from the cup.

The presence of pull tab 60 and the downwardly sloping lid bottom wall 38 provide a clear visual indication to a user that the beverage should be drunk from a dispensing side of the lid, that is, at a point spaced from the pull tab, thereby to ensure that no beverage will leak from the cup through passages 52 and 62 when the mug is tilted for drinking purposes. The downward sloping of lid bottom wall 38 additionally assists in the washing away of solids tending to adhere to the lower surface of the screen element 42, thereby to facilitate flow of beverage through the screen element and openings 40. Spent solids are retained in the cup and/or adhered to the lower surface of the lid and may be readily removed, as by rinsing.

A first alternative form of the invention is shown in FIG. 5, wherein elements similar to mug 10 of FIG. 2 are designated by like one hundred series numerals. Thus, in FIG. 5, a cup 112 having a side wall 126 is shown as receiving a charge 116 and as being removably connected to a lid 114 having a bottom wall 138 formed with openings 140 covered by a screen element 142 and a side wall 144 from which projects a pull tab 160. This construction differs from that of mug 10 in that lid 114 is removably connected and liquid sealed relative to cup 114 by forming lid rim 148 to define a downwardly opening mounting recess 170, which extends peripherally of the lid between opposite ends of panel portion 150 and is sized/shaped to resiliently snap-fit receive a similarly sized/shaped mounting rib defined by rim 130 of cup 112. 10 This construction additionally differs in that lid side wall 144 and panel portion 150 extend vertically above lid rim 148 in order to define a deeper reservoir 146 for brewed beverage, and in that pull tab 160 is disposed vertically above rim 148, whereby to cooperate with cup rim 130 to define second passage 162 without requiring the lower surface of the pull tab to be recessed for this purpose.

Figure 6:
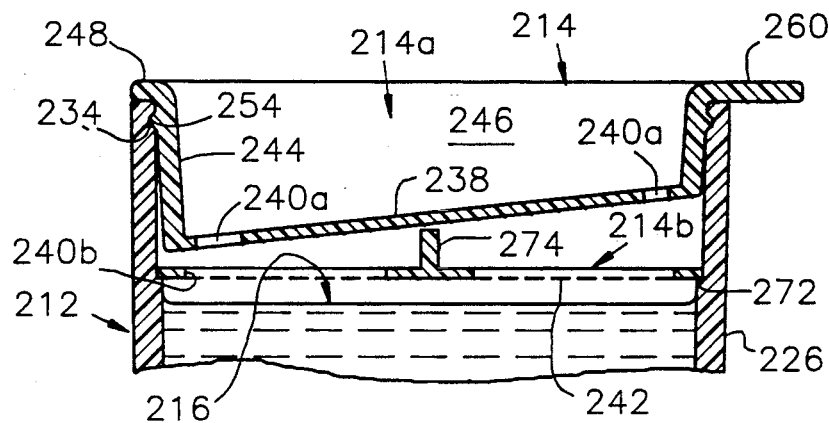
FIG. 6 is a partial, vertical cross-sectional view similar to FIG. 2, but showing a second alternative embodiment of the invention.

A second alternative form of the invention is shown in FIG. 6, wherein elements similar to mug 10 of FIG. 2 are designated by like two hundred series numerals. In this construction, lid 214 is of two-piece construction, including an upper or beverage reservoir portion 214a, which is resiliently snap-fit secured to cup side wall 226 via a mounting recess 234 defined by the cup side wall and a mounting rib 254 carried by lid side wall 244; and a separately formed lower or filter portion 214b.

Figure 7:
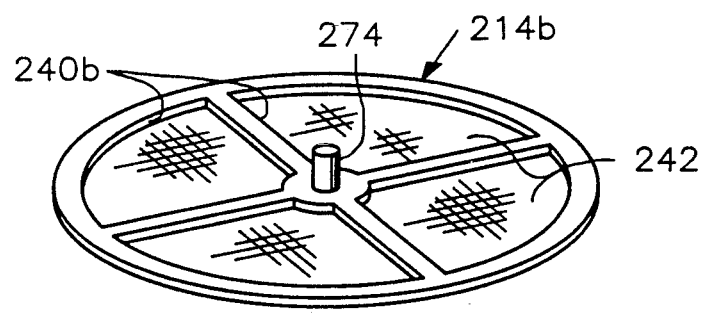
FIG. 7 is a perspective view of the filter depicted in FIG. 6.

Lower portion 214b is shown in FIGS. 6 and 7 as being removably peripherally edge supported by an annular abutment 272 defined by the inner surface of cup side wall 226 and as preferably being positionally maintained against such abutment by means of a centrically located projection 274 arranged to removably underengage lid bottom wall 238. In this construction, flow through openings of the lid are defined by two or more unobstructed openings 240a extending through lid bottom wall 238 and a plurality of openings 240b extending through lower portion 214b and bridged by screen element(s) 242. Further, in this construction, at least one of openings 240a is disposed relatively adjacent pull tab 260 to primarily serve as a steam/air vent passage, and at least one of openings 240a is disposed relatively remotely of the pull tab to primarily serve as a beverage passage.

Figure 8:
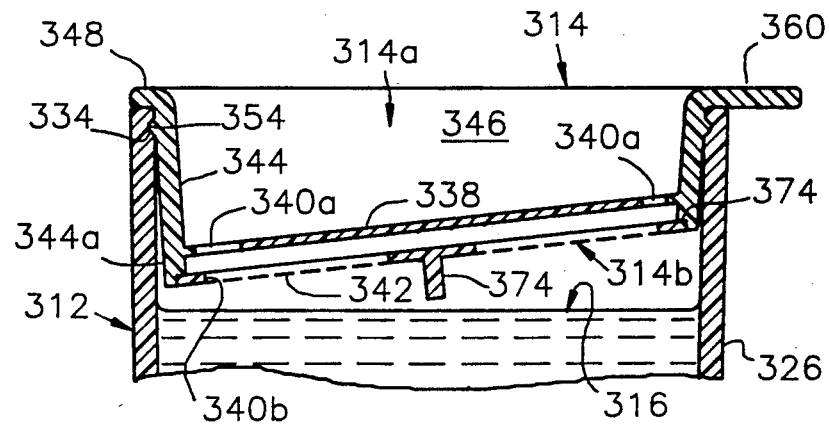
FIG. 8 is a partial vertical cross-sectional view similar to FIG. 6, but showing a third alternative embodiment of the invention.

A third alternative form of the invention is shown in FIG. 8, wherein elements similar to those shown in FIGS. 2 and 6 are designated by like three hundred series numerals. This construction differs primarily from the construction of FIG. 6 in that lower or filter portion 314b is inverted and removably, frictionally slip fit received within an inwardly facing annular mounting recess 374 defined by a portion 344a of lid side wall 344 arranged to project below bottom wall 338. The constructions of FIGS. 6 and 8 serve to better shield their screen elements from damage when their mugs are in use, while at the same time providing for a substantially larger exposed filtering surface, as compared to that of the screen elements of FIGS. 2 and 5, with a view towards avoiding the necessity for providing a separately defined steam exhaust passageway or air vent. However, the mesh size of the screen elements of FIGS. 6–8 are required to be larger than the screen elements of FIG. 2 in order to ensure passage of air and steam therethrough.

Figure 9:
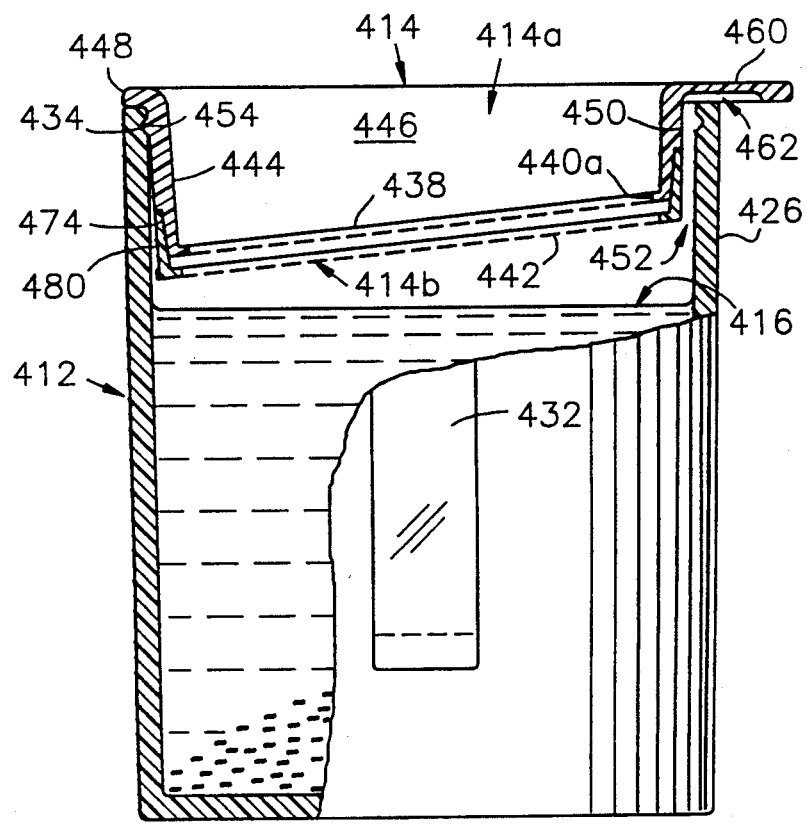
FIG. 9 is a vertical cross-sectional view similar to FIG. 2, but showing a fourth alternative embodiment of the invention.
Figure 10:
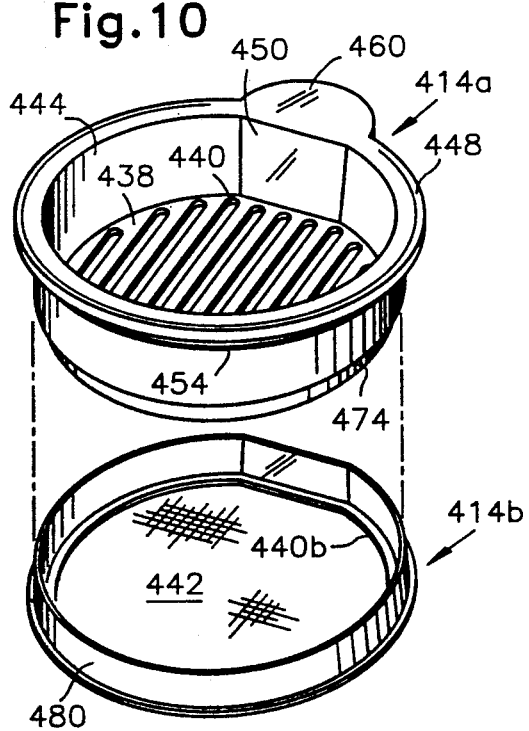
FIG. 10 is an exploded, perspective view of the lid of the embodiment of the invention shown in FIG. 9.
Figure 11:
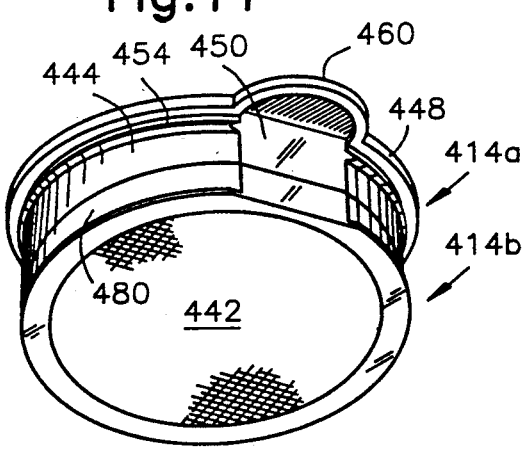
FIG. 11 is a perspective view of the lid of FIG. 10 in assembled condition.

A fourth alternative form of the invention is shown in FIGS. 9–11, wherein elements similar to those shown in FIGS. 2 and 8 are designated by like four hundred series numerals. In this construction, lower or filter lid portion 414b is removably connected to upper lid portion 414a by forming the lower portion with an upstanding, peripherally extending flange 480 sized/shaped to be removably, frictionally slip fit received within an outwardly facing mounting recess 474 defined by lid side wall 444 and panel portion 450. Further, in this construction, an additional screen element 442a is preferably carried by upper lid portion 414a and sized to be of a finer mesh than screen element 442 in order to more finely filter the brewed beverage. This construction possesses the advantage of the embodiments of FIGS. 6 and 8 with regard to better shielding its screen element from damage, and due to the provision of a steam vent defined by interconnected passages 452 and 462, also permits its screen element to be of much finer mesh than that of the embodiments of FIGS. 6 and 8, as will ensure against the escape of any solids from cup 412, even if of very fine grind.

What is claimed is:

1. A beverage brewer and travel mug for use in brewing a beverage within the confines of a microwave oven and subsequently to provide a non-spill, transportable container from which brewed beverage may be drunk or poured, said mug comprising:

A cup having a bottom wall and a side wall terminating in an open mouth for receiving a charge of liquid and solids to be heated to a brewing temperature for producing said brewed beverage; and a lid means removably fixed to said cup for covering said mouth and straining said solids from said brewed beverage incident to drinking or pouring thereof from said cup through said lid means, said lid means having filtering openings for straining said brewed beverage poured from said cup and a reservoir from which said brewed beverage may be drunk or poured, said reservoir being disposed in flow communication with said filtering openings for receiving said brewed beverage strained by said filtering openings and opening upwardly in a direction away from said bottom wall, and said lid mean sand said cup having means cooperating to provide a liquid seal between said cup and said lid means about at least a portion of the periphery of said mouth for preventing flow of said brewed beverage not strained by said filtering openings through said mouth when said mug is tipped for purposes of permitting drinking or pouring of said brewed beverage from said reservoir.

2. A mug according to claim 1, wherein vent means is provided for placing said cup in flow communication with the atmosphere to allow escape of steam from said cup, and indicating mean is provided to designate a dispensing side of said reservoir disposed remotely of said vent means and from which said brewed beverage may be drunk or poured from said reservoir upon tilting of said mug without escape of said brewed beverage from said cup through said vent means.

3. A mug according to claim 1, wherein said lid means and said cup have mounting rib and recess means for removably resiliently snap-fitting said lid means to said cup and to place said reservoir adjacent said mouth.

4. A beverage brewer and travel mug for use in brewing a beverage within the confines of a microwave oven and subsequently to provide a non-spill, transportable container from which brewed beverage may be drunk or poured, said mug comprising;

a cup having a bottom wall and a side wall terminating in an open mouth for receiving a charge of liquid and solids to be heated to a brewing temperature for producing said brewed beverage; and a lid means removably fixed to said cup for covering said mouth and straining said solids from said brewed beverage incident to drinking or pouring thereof from said cup through said lid means, said lid means having filtering openings for straining said brewed beverage poured from said cup and a reservoir disposed inflow communication with said filtering openings for receiving said brewed beverage strained by said filtering openings and opening in a direction away from said bottom wall, said lid means including a side wall means peripherally bounding said reservoir and bottom wall means peripherally joined to said side wall means and cooperating therewith to define said reservoir, said side wall means has a panel portion thereof spaced from said side wall to define a first passage extending in a direction away from said bottom wall and a pull tab arranged adjacent said panel portion for facilitating removal of said lid means from said cup, said pull tab cooperating with a rim of said side wall bounding said open mouth to define a second passage communicating with said first passage to define vent means for placing said cup in flow communication with the atmosphere.

5. A mug according to claim 4, wherein said bottom wall means has flow openings extending therethrough, and screen means extends across said flow openings to define said filtering openings.

6. A mug according to claim 4, wherein said lid means includes a first portion having flow openings extending therethrough and into said reservoir and a second portion having at least one flow opening extending therethrough, said second portion being disposed intermediate said first portion and said bottom wall of said cup and having screen means extending across the flow openings thereof to define said filtering openings, and said second portion is removably fixed to said side wall means.

7. A mug according to claim 4, wherein said panel portion has opposite sides, and said lid means and said cup cooperate to define a liquid seal extending peripherally of said side wall means between said opposite sides of said panel portion.

8. A mug according to claim 7, wherein said liquid seal is defined at least in part by mounting groove and mounting rib means cooperating to removably fix said lid means to said cup.

9. A mug according to claim 7, wherein said liquid seal is defined by a mounting recess defined by said lid means and said rim.

10. A mug according to claim 9, wherein said pull tab has a surface arranged to face said rim and said surface is spaced from said rim when said rim is received within said mounting recess.

11. A mug according to claim 4, wherein said panel portion has opposite sides, said lid means includes a rim means extending peripherally of said side wall means between said opposite sides, said side wall defines a mounting recess extending peripherally thereof, said side wall means has a mounting rib extending peripherally thereof between said opposite sides for removable receipt within said mounting recess for removably fixing said lid means to said cup, said rim means has a lower surface, said pull tab has a generally U-shaped lower edge surface arranged to lie coplanar with said lower surface and a centrally located recessed area bounded by said edge surface and said panel portion, said edge surface having opposite ends arranged together with said lower surface to engage said rim when said mounting rib is received within said mounting recess, and said recessed area cooperates with said rim to define said second passage.

12. A beverage brewer and travel mug for sue in brewing a beverage within the confines of a microwave oven and subsequently to provide a non-spill, transportable container from which brewed beverage may be drunk or poured, said mug comprising:
a cup having a bottom wall and a side wall terminating in an open mouth for receiving a charge of liquid and solids to be heated to a brewing temperature for producing said brewed beverage; and
a lid means removably fixed to said cup for covering said mouth and straining said solids form said brewed beverage incident to drinking or pouring thereof rom said cup through said lid means, said lid means having filtering openings for straining said brewed beverage poured from said cup and a reservoir disposed in flow communication with said filtering openings for receiving said brewed beverage strained by said filtering openings and opening in a direction away from said bottom wall, said lid means including an upper portion serving to define said reservoir and cooperating with said side wall to removably fix said lid means said cup and a lower portion defining said filtering openings, and said upper portion has a bottom wall means having through openings for placing said reservoir in flow communication with said filtering openings.

13. A mug according to claim 123, wherein said lower portion is removably fixed to said upper portion.

14. A mug according to claim 13, wherein said upper portion has side wall means, said side wall means being formed with an inset panel portion and a pull tab for use in removing said lid means from said cup, said panel portion cooperating with said side wall to define a first passage extending from within said cup in a direction away from said bottom wall and said pull tab is arranged to overlie a rim defined by said side wall and cooperate therewith to define a second passage communicating with said first passage for placing said cup in flow communication with the atmosphere.

15. An assembly according to claim 12, wherein said side wall is formed with an abutment, and said lower portion is removably positionally located between said upper portion and said abutment.

16. A mug according to claim 12, wherein said side wall includes an abutment arranged intermediate said bottom wall and said open mouth, said lower portion is of disc-like configuration and has its periphery removable engageable with said abutment, and said lower portion has an upstanding projection engageable by said upper portion to maintain said lower portion in engagement with said abutment when said lid means is removably fixed to said cup.

17. A mug according to claim 12, wherein said lower portion is of disc-like configuration and has its periphery removably fixed to said upper portion.

18. A beverage brewer and travel mug for use in brewing a beverage within the confines of a microwave oven and subsequently to provide a non-spill, transportable container from which brewed beverage may be drunk or poured, said mug comprising:
a cup having a bottom wall and a side wall terminating in an open mouth for receiving a charge of liquid and solids to be heated to a brewing temperature for producing said brewed beverage; and
a lid means removably fixed to said cup for covering said mouth and straining said solids from said brewed beverage incident to drinking or pouring thereof from said cup through said lid means, said lid means having filtering openings for straining said brewed beverage poured from said cup and a reservoir disposed in flow communication with said filtering openings for receiving said brewed beverage strained by said filtering openings and opening in a direction away from said bottom wall, said lid means including side wall means peripherally bounding said reservoir and a pull tab projecting radially outwardly of said side wall means for sue in effecting manual removal of said lid means from said cup, said side wall means cooperating with said side wall to removably fix said lid means to said cup and define a fist passage extending away from said bottom wall, said pull tab being arranged to overlie a rim of said side wall and cooperating therewith to define a second passage arranged for flow communication with said first passage to define vent means for placing said cup in flow communication with the atmosphere.

19. A mug according to claim 18, wherein said side wall means and said side wall have cooperating mounting rib and recess means for removably fixing said lid means to said cup in a fluid sealed relationship about said open mouth except for said vent means.

20. A mug according to claim 19, wherein said lid means includes an upper portion and a separate lower portion removably fixed to said upper portion, said upper portion including said side wall means and a bottom wall means cooperating to define said reservoir, said lower portion defining said filtering openings, and said bottom wall means having through openings for placing said reservoir in flow communication with said filtering openings.

21. A beverage brewer and travel mug for use in brewing a beverage within the confines of a microwave oven and subsequently to provide a non-spill, transportable container from which brewed beverage may be drunk or poured, said mug comprising:
- a cup having a bottom wall and a side wall terminating in an open mouth for receiving a charge of liquid and solids to be heated to a brewing temperature for producing said brewed beverage; and
- a lid means removably fixed to said cup for covering said mouth and straining said lids from said brewed beverage incident to drinking or pouring thereof from said cup through said lid means, said lid means having filtering openings for straining said brewed beverage poured from said cup, a reservoir located to be disposed adjacent said mouth in flow communication with said filtering openings for receiving said brewed beverage strained by said filtering openings, said lid means having side wall means and bottom wall means peripherally joined to said side wall means and cooperating therewith to define said reservoir, and said lid means and said cup having mounting rib and recess means for removably resiliently snap-fitting said lid means to said cup and to place said reservoir adjacent said mount and to open upwardly in a direction away from said bottom wall.

22. A mug according to claim 21, wherein said filtering openings extend through said bottom wall means, and said side wall and said side wall means define said mounting rib and recess means.

* * * * *

UNITED STATES PATENT AND TRADEMARK OFFICE
CERTIFICATE OF CORRECTION

PATENT NO. : 5,168,140
DATED : 12/1/92
INVENTOR(S) : H. Welker

It is certified that error appears in the above-identified patent and that said Letters Patent is hereby corrected as shown below:

Col. 4, line 32 - after "112.", delete --10--.

Col. 5, line 62 - "mean" should be --means--.

Col. 5, line 63 - "sand" should be --and--.

Col. 7, line 31 - "sue" should be --use--.

Col. 7, line 41 - "form" should be --from--.

Col. 7, line 43 - "rom" should be --from--.

Col. 7, line 58 - "123" should be --12--.

Col. 8, line 42 - "sue" should be --use--.

Col. 8, line 45 - "fist" should be --first--.

Col. 9, line 8 - "lids" should be --solids--.

Signed and Sealed this

Twenty-sixth Day of October, 1993

Attest:

BRUCE LEHMAN

*Attesting Officer*   *Commissioner of Patents and Trademarks*